US009467737B2

(12) United States Patent
Coburn, IV et al.

(10) Patent No.: US 9,467,737 B2
(45) Date of Patent: Oct. 11, 2016

(54) ZONE GROUP CONTROL

(71) Applicant: Sonos, Inc., Santa Barbara, CA (US)

(72) Inventors: Arthur Coburn, IV, Lexington, MA (US); Sherwin Liu, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 80 days.

(21) Appl. No.: 14/330,871

(22) Filed: Jul. 14, 2014

(65) Prior Publication Data

US 2014/0324203 A1    Oct. 30, 2014

(51) Int. Cl.
| | |
|---|---|
| *G06F 17/00* | (2006.01) |
| *H04N 21/436* | (2011.01) |
| *H04N 21/4227* | (2011.01) |
| *H04N 21/442* | (2011.01) |
| *H04N 21/45* | (2011.01) |
| *H04N 21/482* | (2011.01) |

(Continued)

(52) U.S. Cl.
CPC .... *H04N 21/43615* (2013.01); *H04L 12/2809* (2013.01); *H04N 21/4227* (2013.01); *H04N 21/44227* (2013.01); *H04N 21/4516* (2013.01); *H04N 21/485* (2013.01); *H04N 21/4825* (2013.01); *H04N 21/8113* (2013.01); *H04L 2012/2849* (2013.01)

(58) Field of Classification Search
CPC .................. H04L 12/2809; H04L 2012/2849; H04N 21/4227; H04N 21/43615; H04N 21/44227; H04N 21/4516; H04N 21/4825; H04N 21/485; H04N 21/8113; G06F 17/30017; G06F 17/30053; G06F 17/3074; G06F 17/30029; G06F 17/30035; G06F 17/30699; G06F 17/30761; G06F 17/30766; G11B 27/102; G11B 27/105
See application file for complete search history.

(56) References Cited

U.S. PATENT DOCUMENTS

| | | | |
|---|---|---|---|
| 5,406,634 | A | 4/1995 | Anderson et al. |
| 5,856,827 | A | 1/1999 | Sudo |

(Continued)

FOREIGN PATENT DOCUMENTS

| | | |
|---|---|---|
| KR | 20090017795 | 2/2009 |
| WO | 0147248 | 6/2001 |
| WO | 0153994 | 7/2001 |

OTHER PUBLICATIONS

Bluetooth. "Specification of the Bluetooth System: The ad hoc SCATTERNET for affordable and highly functional wireless connectivity" Core, Version 1.0 A, Jul. 26, 1999, 1068 pages.

(Continued)

*Primary Examiner* — Hemant Patel
(74) *Attorney, Agent, or Firm* — McDonnell Boehnen Hulbert & Berghoff LLP

(57) ABSTRACT

Method and systems are provided for detecting and handling, by a controller device, a loss of control of a playback queue of a zone group of a media playback system. Detection of loss of control of the playback queue of the zone group may involve one or more of determining (i) that the zone group no longer exists, (ii) that a queue identifier is no longer assigned to a playback queue of the zone group, and (iii) that the controller device is no longer in communication with the media playback system, among others. Handling of the loss of control may involve one or more of (i) unsubscribing from messages relating to the zone group, (ii) ceasing to send commands to the zone group, and (iii) updating a user interface to indicate that the controller device no longer has control of the playback queue of the zone group, among others.

20 Claims, 8 Drawing Sheets

(51) Int. Cl.
*H04N 21/485* (2011.01)
*H04N 21/81* (2011.01)
*H04L 12/28* (2006.01)

(56) References Cited

U.S. PATENT DOCUMENTS

| | | | |
|---|---|---|---|
| 5,923,902 A | 7/1999 | Inagaki | |
| 6,002,862 A | 12/1999 | Takaike | |
| 6,181,316 B1 | 1/2001 | Little et al. | |
| 6,255,961 B1 | 7/2001 | Van Ryzin et al. | |
| 6,256,554 B1 | 7/2001 | DiLorenzo | |
| 6,404,811 B1 | 6/2002 | Cvetko et al. | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,017,118 B1 | 3/2006 | Carroll | |
| 7,020,048 B2 | 3/2006 | McComas | |
| 7,113,833 B1 | 9/2006 | Brown et al. | |
| 7,117,451 B2 | 10/2006 | Sielken | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,187,947 B1 | 3/2007 | White et al. | |
| 7,236,773 B2 | 6/2007 | Thomas | |
| 7,312,785 B2 | 12/2007 | Tsuk et al. | |
| 7,358,960 B2 | 4/2008 | Mak | |
| 7,483,538 B2 | 1/2009 | McCarty et al. | |
| 7,571,014 B1 | 8/2009 | Lambourne et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,797,446 B2 | 9/2010 | Heller et al. | |
| 7,805,682 B1 | 9/2010 | Lambourne | |
| 7,853,341 B2 | 12/2010 | McCarty et al. | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,103,009 B2 | 1/2012 | McCarty et al. | |
| 8,131,390 B2 | 3/2012 | Braithwaite et al. | |
| 8,234,395 B2 | 7/2012 | Millington | |
| 8,364,296 B2* | 1/2013 | Wilhelm | G11B 27/10 455/502 |
| 2001/0042107 A1 | 11/2001 | Palm | |
| 2002/0002039 A1 | 1/2002 | Qureshey et al. | |
| 2002/0022453 A1 | 2/2002 | Balog | |
| 2002/0026442 A1 | 2/2002 | Lipscomb et al. | |
| 2002/0124097 A1 | 9/2002 | Isely et al. | |
| 2002/0165921 A1 | 11/2002 | Sapieyevski | |
| 2002/0178191 A1 | 11/2002 | Sielken | |
| 2003/0023741 A1 | 1/2003 | Tomassetti et al. | |
| 2003/0143944 A1 | 7/2003 | Martin et al. | |
| 2003/0157951 A1 | 8/2003 | Hasty | |
| 2003/0198257 A1 | 10/2003 | Sullivan et al. | |
| 2003/0210796 A1 | 11/2003 | McCarty et al. | |
| 2004/0024478 A1 | 2/2004 | Hans et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0215611 A1 | 10/2004 | Jawa et al. | |
| 2004/0261040 A1 | 12/2004 | Radcliffe et al. | |
| 2005/0028225 A1 | 2/2005 | Dawson et al. | |
| 2005/0108320 A1 | 5/2005 | Lord et al. | |
| 2005/0155072 A1 | 7/2005 | Kaczowka et al. | |
| 2005/0166157 A1 | 7/2005 | Ollis et al. | |
| 2005/0251565 A1* | 11/2005 | Weel | G06F 17/30053 709/219 |
| 2005/0262253 A1 | 11/2005 | Li et al. | |
| 2006/0107237 A1 | 5/2006 | Kim | |
| 2006/0168340 A1 | 7/2006 | Heller et al. | |
| 2006/0253782 A1 | 11/2006 | Stark et al. | |
| 2007/0038999 A1 | 2/2007 | Millington | |
| 2007/0142944 A1 | 6/2007 | Goldberg et al. | |
| 2007/0288470 A1 | 12/2007 | Kauniskangas et al. | |
| 2008/0005690 A1 | 1/2008 | Van Vugt | |
| 2008/0016465 A1 | 1/2008 | Foxenland | |
| 2008/0134256 A1 | 6/2008 | DaCosta | |
| 2009/0060219 A1* | 3/2009 | Inohara | H04S 3/002 381/77 |
| 2009/0228919 A1 | 9/2009 | Zott et al. | |
| 2010/0082731 A1 | 4/2010 | Haughay et al. | |
| 2010/0131567 A1 | 5/2010 | Dorogusker et al. | |
| 2010/0284389 A1 | 11/2010 | Ramsay et al. | |
| 2011/0004330 A1 | 1/2011 | Rothkopf et al. | |
| 2011/0179455 A1 | 7/2011 | Thompson | |
| 2011/0264732 A1 | 10/2011 | Robbin et al. | |
| 2012/0089910 A1 | 4/2012 | Cassidy | |
| 2012/0117586 A1 | 5/2012 | McCoy et al. | |
| 2012/0304233 A1 | 11/2012 | Roberts et al. | |
| 2013/0174204 A1 | 7/2013 | Coburn et al. | |
| 2013/0191749 A1 | 7/2013 | Coburn, IV et al. | |
| 2013/0343567 A1 | 12/2013 | Triplett et al. | |
| 2013/0346859 A1 | 12/2013 | Bates et al. | |
| 2014/0176298 A1 | 6/2014 | Kumar et al. | |
| 2014/0176299 A1 | 6/2014 | Kumar et al. | |
| 2014/0181199 A1 | 6/2014 | Kumar et al. | |
| 2014/0181654 A1 | 6/2014 | Kumar et al. | |
| 2014/0181655 A1 | 6/2014 | Kumar et al. | |
| 2014/0181656 A1 | 6/2014 | Kumar et al. | |
| 2014/0181997 A1 | 6/2014 | Kumar et al. | |

OTHER PUBLICATIONS

Bluetooth. "Specification of the Bluetooth System: Wireless connections made easy" Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages.
Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.
Palm, Inc. "Handbook for the Palm VII Handheld" May 2000, 311 pages.
"Welcome. You're watching Apple TV." Apple TV 1st Generation Setup Guide, Apr. 8, 2008 <http://manuals.info.apple.com/MANUALS/0/MA403/en_US/AppleTV_SetupGuide.pdf> Retrieved Oct. 14, 2014, 40 pages.
"Welcome. You're watching Apple TV." Apple TV 2nd Generation Setup Guide, Mar. 10, 2011 <http://manuals.info.apple.com/MANUALS/1000/MA1555/en_US/Apple_TV_2nd_gen_Setup_Guide.pdf> Retrieved Oct. 16, 2014, 35 pages.
"Welcome. You're watching Apple TV." Apple TV 3rd Generation Setup Guide, Mar. 16, 2012 <http://http://manuals.info.apple.com/MANUALS/1000/MA1607/en_US/apple_tv_3rd_gen_setup.pdf> Retrieved Oct. 16, 2014, 35 pages.
"Presentations at WinHEC 2000" May 2000, 138 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.

(56) References Cited

OTHER PUBLICATIONS

International Preliminary Search Report for Application No. PCT/US2012/071212, mailed Jul. 10, 2014, 8 pages.

International Searching Authority, "Search Report", issued in connection with International Patent Application No. PCT/US2013/046383, mailed on Sep. 30, 2013, 3 pages.

International Searching Authority, "Written Opinion", issued in connection with International Patent Application No. PCT/US2013/046383, mailed on Sep. 30, 2013, 7 pages.

Jo J., et al., "Synchronized One-to-many Media Streaming with Adaptive Playout Control," Proceedings of SPIE, 2002, vol. 4861, pp. 71-82.

UPnP; "Universal Plug and Play Device Architecture"; Jun. 8, 2000; version 1.0; Microsoft Corporation; pp. 1-54.

International Searching Authority, International Search Report and Written Opinion mailed on Nov. 2, 2015 (received on Apr. 14, 2016), issued in connection with International Application No. PCT/US2015/040354, filed on Jul. 14, 2015, 11 pages.

\* cited by examiner

ZONE GROUP CONTROL

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
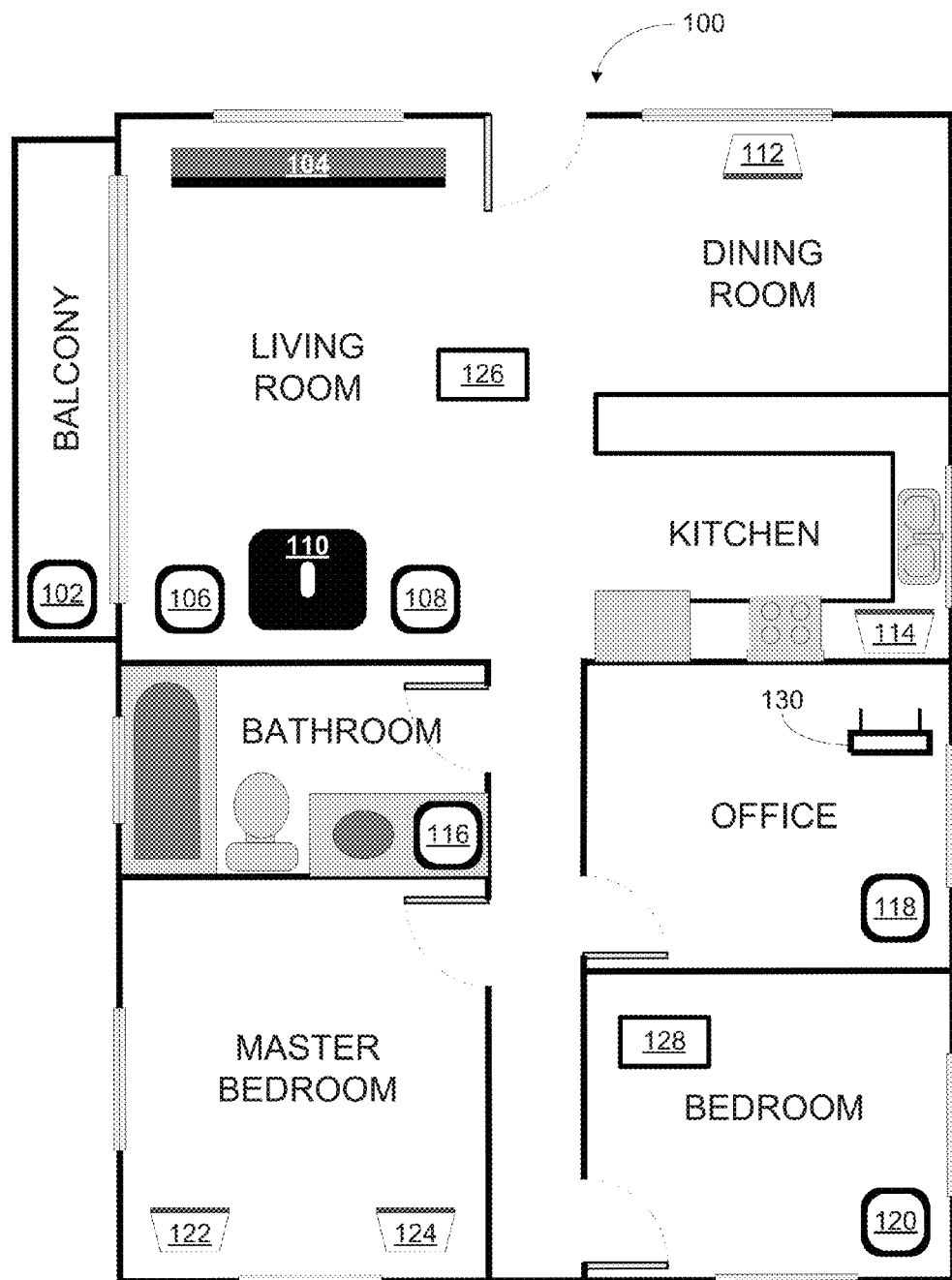
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples discussed herein relate to a controller device detecting and handling a loss of control of a playback queue of a zone group of a media playback system. Detecting of loss of control of a playback queue of the zone group may involve one or more of determining (i) that the zone group no longer exists, (ii) that a queue identifier is no longer assigned to a playback queue of the zone group, and (iii) that the controller device is no longer in communication with the media playback system, among others. Handling of the loss of control may involve one or more of (i) unsubscribing from messages relating to the zone group, (ii) ceasing to send commands to the zone group, and (iii) updating a user interface to indicate that the controller device no longer has control of the playback queue of the zone group, among others.

In one example, a controller device may gain control of a playback queue of a zone group in a media playback system when the controller device accesses the media playback system and causes the zone group to play media content. In one case, the media content may include one or more media items identified in a playlist on the controller device. In one case, gaining control of the zone group may involve gaining control of a playback queue of the zone group.

Causing the zone group to play the media content identified in the playlist may involve populating a playback queue of the zone group with the media content. Over time, one or more media items from one or more playlists may be added or removed from the playback queue. In one case, the one or more media items in the playback queue may reflect the one or more playlists on the controller device. For instance, if media items identified in a playlist that were added to the playback queue, and subsequently one or more of the media items were added or removed from the playlist, the playback queue may be updated accordingly such that the playback queue reflects the latest version of the playlist on the controller. Other examples are also possible.

Upon populating the playback queue with the media content identified in the playlist, a queue identifier may be assigned to the playback queue. The queue identifier identifies the particular instance of the playback queue. In one case, a playback device in the zone group, such as a group coordinator for the zone group, may generate the queue identifier when the playback queue is populated, and may provide the queue identifier to the controller device.

Gaining control of the playback queue of the zone group may further involve generating a queue owner identification associated with the playback queue. The queue owner identification allows the controller device to control the playback queue of the zone group, while the queue identifier is assigned to the playback queue. In one case, the controller device generates the queue owner identification when gaining control of the playback queue of the zone group, and may provide the queue owner identification to one or more devices in the zone group.

In one example, a configuration of the zone group may change while the controller has control of the playback queue of the zone group. For instance, one or all of the at least one playback device in the zone group may leave (or be removed from) the zone group. In one case, a group coordinator of the zone group may leave the zone group. The group coordinator, prior to leave, may send the controller device a message indicating that it is leaving the zone group. In one instance, an existence of the zone group may be tied to a particular playback device being the group coordinator of the zone group. As such, based on the message, the controller device may determine that the zone group no longer exists. When the zone group no longer exists, the controller device no longer has control of the playback queue of the zone group.

In another case, the zone group may no longer exist when all playback devices in the zone group has left (or was removed from) the zone group. In one instance, a last of the at least one playback device to leave the zone group may send the controller device a message indicating that the last of the at least one playback device is leaving the zone group. Based on the message, the controller device may determine that the zone group no longer exists. When the zone group no longer exists, the controller device no longer has control of the playback queue of the zone group.

In a further case, the controller device may receive from one or more devices in the media playback system, a transmission indicating a current media playback system network topology. Based on the current network topology, the controller device may determine that the zone group no longer exists. When the zone group no longer exists, the controller device no longer has control of the playback queue of the zone group.

In some cases, after the controller device gains control of the playback queue of the zone group, the controller device and one of the at least one playback devices in the zone group may further exchange transmissions. For instance, the playback device may transmit to the first controller device, a message indicating a playback state of the zone group. The playback state of the zone group may include whether the media content is being played or paused, and what media content the zone group is playing or about to play, among other examples. The message may further include the queue identifier assigned to the playback queue of the zone group.

In one example, a second device may access the zone group and modify the playback queue. For instance the second device may gain control of the playback queue of the zone group similarly to that described above, replacing the content of the playback queue in the process. In such a case, the playback queue of the one group may be assigned a different queue identifier. Subsequently, when the controller device receives a message indicating a playback state of the zone group, the message may indicate a different queue identifier than that assigned to the playback queue when the controller device previous gained control of the playback queue. Based on the different queue identifier, the controller device may determine that the controller device has lost control of the playback queue of the zone group.

In a further example, the controller device may no longer be in communication with the media playback system. In one case, a local area network via which the controller device and the media playback system communicate may be unavailable, and the controller device is no longer in communication with the media playback system. In another case, a wireless interface of the controller device may have been deactivated such that the controller device may no longer communicate with the media playback system. In a further case, the controller device may be a mobile device that has been moved beyond communicative range of the media playback system. In the cases above, as well as other possible cases, the controller device may determine that the controller device has lost control of the playback queue of the zone group because the controller device is no longer in communication with the media playback system. Other examples are also possible.

In one example, upon determining that the controller device has lost control of the playback queue of the zone group, the controller device may responsively unsubscribe from messages relating to the zone group. For instance, the controller device may unsubscribe from messages indicating playback states of the zone group. In one case, unsubscribing from the messages may involve sending to the at least one playback device in the zone group, a request to not be transmitted the messages. In another case, unsubscribing from the messages may involve ignoring messages (or a subset of messages) broadcasted from the at least one playback device in the zone group.

In another example, upon determining that the controller device has lost control of the playback queue of the zone group, the controller device may responsively cease to send commands to the zone group. In one example, messages indicating playback states of the zone group may be sent by the at least one playback device in response to a request for playback state information from the controller device. In this case, the controller device may stop sending the request for playback state information.

In a further example, upon determining that the controller device has lost control of the playback queue of the zone group, the controller device may cause a graphical display to display an indication that the controller device no longer has control of the playback queue of the zone group. In one case, the graphical display may display an icon indicating that the controller device is in control of the playback queue of the zone group when the controller device gains control of the playback queue of the zone group. In such a case, the icon maybe modified or removed to indicate that the controller device no longer has control of the playback queue of the zone group. Other examples are also possible.

As indicated above, the present discussions involve detecting and handling, by a controller device, a loss of control of a playback queue for a zone group of at least one playback device in a media playback system. In one aspect, a method is provided. The method involves sending, by a controller device to a playback device in a zone group of a media playback system, data that indicates (i) a queue identifier assigned to a playback queue of the zone group, and (ii) a queue owner identification corresponding to the playback queue. The queue owner identification authorizes the controller device to control the playback queue while the queue identifier is assigned to the playback queue. The method further involves receiving, by the controller device, a transmission indicating that the playback device is no longer part of the zone group, and based on the received transmission, causing, by the controller device, a graphical display to display an indication that the queue identifier is no longer assigned to the playback queue.

In another aspect, a device is provided. The device includes a processor and memory having stored thereon instructions executable by the processor to cause the device to perform functions. The functions include receiving from a playback device in a zone group of a media playback system, data indicating a playback state of the zone group. The data indicates a first queue identifier assigned to a playback queue of the zone group. The functions also include determining that the first queue identifier is different from a second queue identifier. The second queue identifier was previously assigned to the playback queue. The functions further include, based on the determination that the first queue identifier is different from the second queue identifier, unsubscribing from transmissions of the zone group such that the device ignores transmissions indicating playback states of the zone group.

In a further aspect, a non-transitory computer readable memory is provided. The non-transitory computer readable memory has stored thereon instructions executable by a computing device to cause the computing device to perform functions. The functions include sending to a playback device in a zone group of a media playback system, data that indicates (i) a queue identifier assigned to a playback queue of the zone group, and (ii) a queue owner identification corresponding to the playback queue. The queue owner identification authorizes the computing device to control the playback queue while the queue identifier is assigned to the playback queue. The functions further include determining that the device is no longer in communication with the media playback system, and based on determining that the computing device is no longer in communication with the media playback system, causing a graphical display to display an indication that the device is disconnected from the media playback system.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
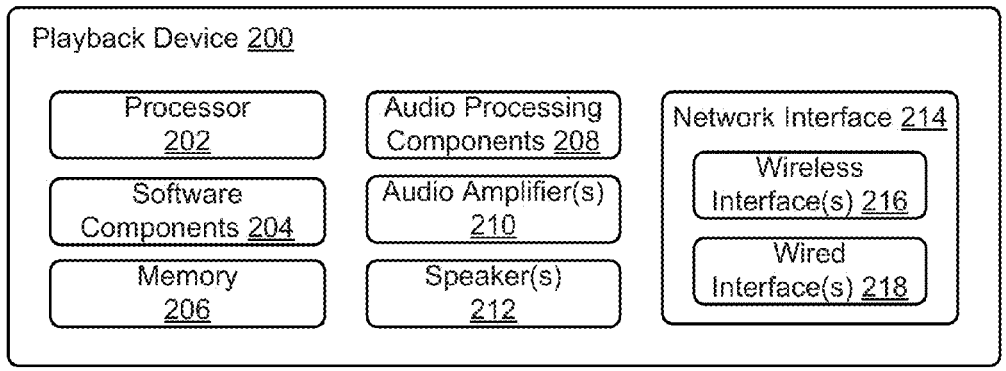
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
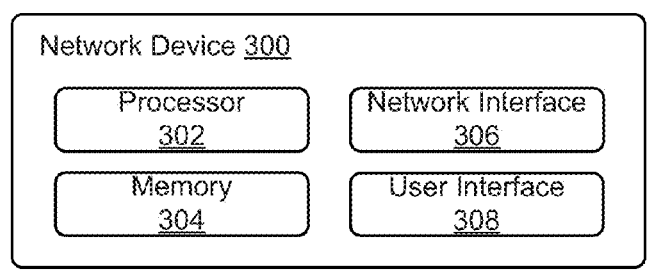
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
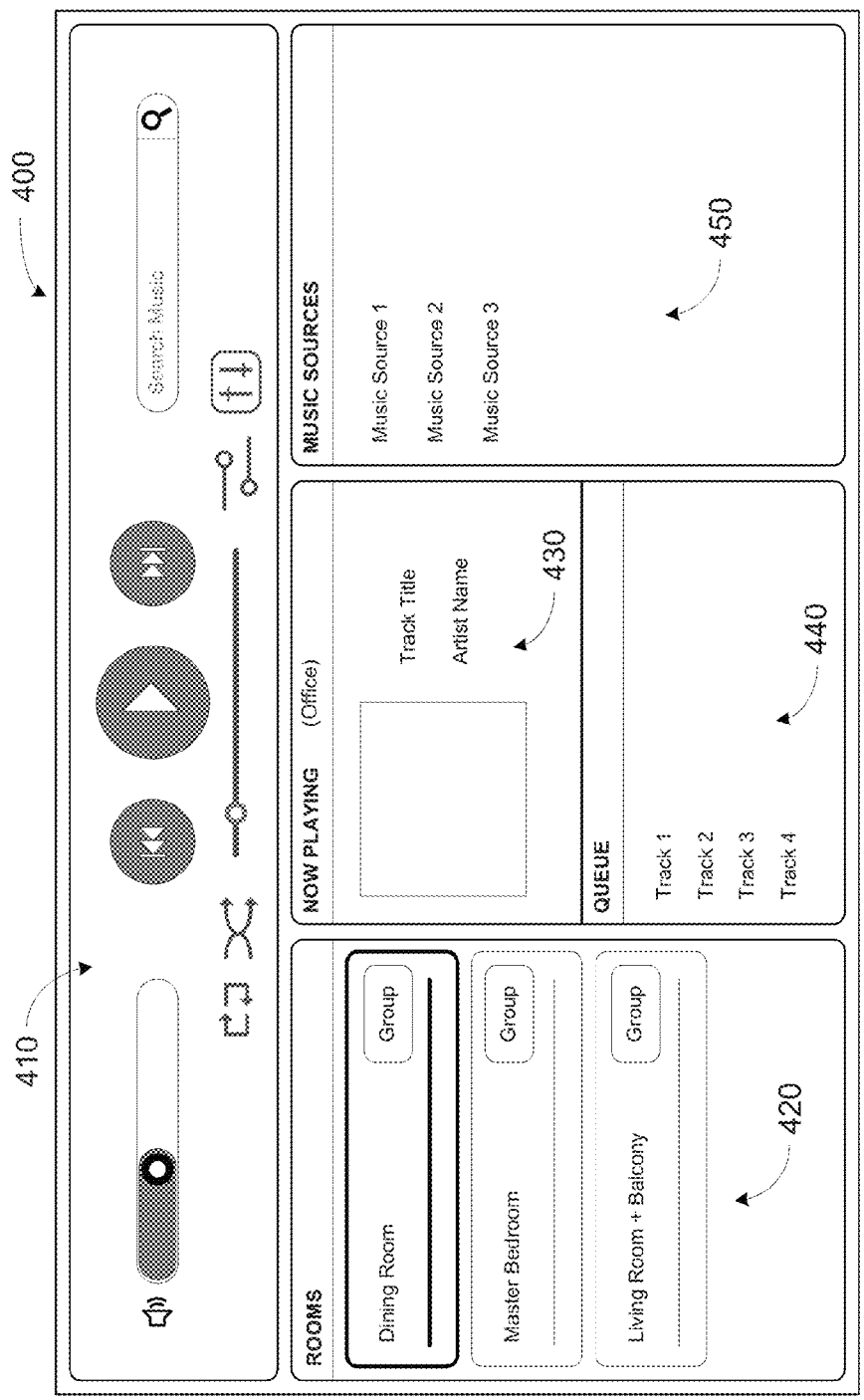
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Determining and Handling Loss of Zone Group Control

Figure 5:
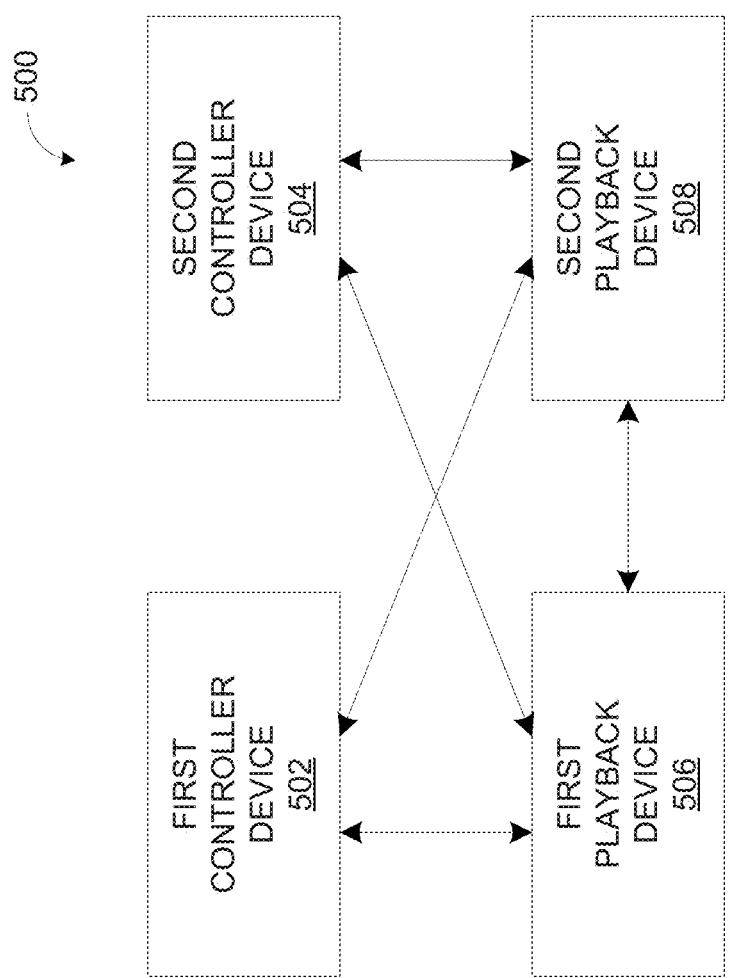
FIG. 5 shows an example media playback system environment.

FIG. 5 shows an example media playback system environment 500. The environment 500 includes a first controller device 502, a second controller device 504, a first playback device 506, and a second playback device 508.

The first controller device 502 and the second controller device 504 may be devices similar to the control device 300 of FIG. 3, and may each have installed thereon software applications to provide an interface that can be used to control a media playback system including the first playback device 506 and the second playback device 508. In one example, the software application may provide a first type of controller interface that is similar to the controller interface 400 of FIG. 4, and may cater specifically to managing and controlling the media playback system. For instance, the software application providing the first type of controller interface may be provided by a manufacturer of the media playback system. In one case, the controller interface 400 may be used to create a zone group and add media content from multiple service providers to a playback queue associated with the zone group.

In another example, the software application may provide a second type of controller interface that is not provided by the manufacturer and/or does not cater specifically to managing and controlling the media playback system. For instance, the second type of controller interface may be affiliated with a particular service provider, and can be used to access media content from the particular service provider. For instance, a user may use the first controller device 502 to listen to media content from the particular service provider (using headphones or speakers on the first controller device 502).

In one case, the software application may also be used to cause media content from the particular service provider to be played by a zone group in the media playback system. For instance, the software application may be a third-party application that is provided by a service provider and that is authorized to play media content from the service provider using the media playback system.

In discussions hereafter, unless otherwise noted, functions by the first controller device 502, and in some cases the second controller device 504, may be performed via a software application that provides a controller interface for accessing and controlling the media playback system. In some examples, the software application may be one that provides the second type of controller interface, such a third-party application.

The first playback device 506 and the second playback device 508 may be playback devices similar to the playback device 200 of FIG. 2, and may be configured as shown in, and discussed in connection to, FIG. 1. As such, the first playback device 506 and the second playback device 508 may be part of a same zone group, or parts of different zone groups. Each zone group has a group coordinator that coordinates synchronous playback of media content by playback devices in the zone group, as described in the sections above. The first playback device 506 may be the group coordinator of a zone group including only the first playback device, a zone group that also includes other playback devices (such as the second playback device 508), or a zone group that includes other playback devices but not the first playback device 506. Analogously, the second playback device 508 may be the group coordinator of a zone group including only the second playback device, a zone group that also includes other playback devices (such as the first playback device 506), or a zone group that includes other playback devices but not the second playback device 508. Other examples are also possible.

The environment 500 is one illustrative environment provided to facilitate discussion of examples herein. Other configurations of the environment 500, including ones with more or fewer devices, are also possible.

a. Establishing Zone Group Control

As indicated above, the first controller device 502 may be executing a software application, and may cause media content from the particular service provider to be played by a zone group for which the first playback device 506 is a group coordinator. As indicated above, the software application may be a third-party application affiliated with a particular service provider. In one case, the media content from the particular service provider may be identified in a playlist of the software application.

In one example, the first controller device 502 may send to the first playback device 506, a message to populate a playback queue of the zone group with media content identified in the playlist of the software application. In response, the first playback device 506 may transmit a message indicating a queue identifier that has been assigned to the populated playback queue. As indicated above, the first playback device 506 may then coordinate playback of the media content in the playback queue of the zone group, by one or more playback devices in the zone group.

In one example, a queue owner identification that corresponds to the instance of the playback queue of the zone group may also be generated. In one case, the queue owner identification may be generated at the first controller device 502. The queue owner identification may be a credential that authorizes the first controller device 502 to control the zone group while the queue identifier is assigned to the playback queue. As such, the queue owner identification may also correspond to the queue identifier. In one case, the first playback device 506 may only perform functions in response to transmissions that include the queue owner identification. For instance, if the second controller device 504 sends to the first playback device 506, a transmission to cause the zone group to perform a certain playback function, but the transmission did not include the queue owner identification, the first playback device 506 may ignore the transmission.

In some cases, only certain playback functions require the queue owner identification. For instance, the queue owner identification may be required to modify the playback queue, but not required to play, pause, or skip to a next song in the playback queue.

In one case, the queue owner identification may be generated by the software application prior to the first controller device 502 sending the message to the first playback device 506 to gain control of the playback queue of the zone group. In this case, the queue owner identification may be included in the message to populate the playback queue of the zone group and gain control of the playback queue of the zone group. In another case, the queue owner identification may be generated by the first playback device 506 (or another device associated with the media playback system), and transmitted to the first controller device 502 along with the queue identifier assigned to the playback queue of the zone group. Other examples are also possible.

Upon assigning the queue identifier to the playback queue, and establishing the queue owner identification credentials, the first controller device 502 has gained control of the playback queue of the zone group, and the software application on the first controller device 502 may be used to control playback of the media contents in the playback queue by the zone group. As indicated above, control commands sent from the first controller device 502 to the first playback device 506 may indicate both the queue identifier and the queue owner identification.

Figure 7B:
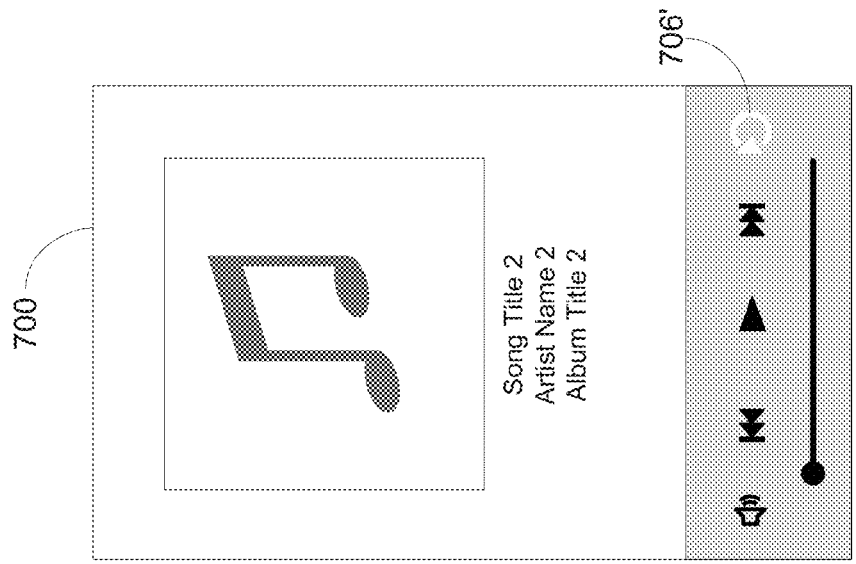
FIG. 7B shows a second example of an interface for controlling media playback.
Figure 7A:
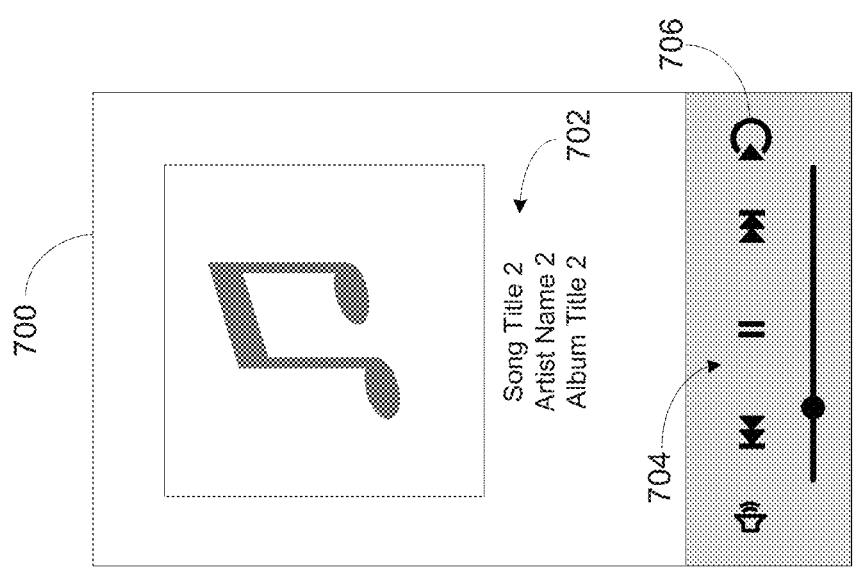
FIG. 7A shows a first example of an interface for controlling media playback.

FIG. 7A shows a first example of an interface 700 for controlling media playback. The interface 700 may be an interface of the software application discussed above, and may be an interface provided on the first controller device 502. In one case, the interface 700 may be an interface of a third-party application, as mentioned above. The interface 700 includes representations of metadata 702 associated with media content being played, and control icons 704 selectable to control playback of the media content. The metadata 702 may include album art, track title, track artist, and album title, among other information associated with the media content being played, and the control icons 704 may include icons for playing the media content, pausing playback of the media content, skipping to a previous track, skipping to a next track, and changing a playback volume, among others.

As shown, the interface 700 also includes a graphical icon 706 that indicates that the first controller device 502 has control of the playback queue of the zone group. In some cases, the interface 700 may further display an indication of the zone group, such as a name of the zone group (not shown). The graphical icon 706 further indicates that the displayed metadata 702 is associated with media content being played by the zone group, and that selections of the control icons 704 will be applied to control playback by the zone group. Other examples are also possible.

In one example, transmissions between the first controller device 502 and the first playback device 506 while the first controller device 502 has control of the playback queue of the zone group may include both the queue identifier assigned to the playback queue and the queue owner identification, in addition to any inputs or commands for the zone group to execute. For instance, the first controller device 502 may send a transmission that includes the queue identifier, the queue owner identification, and a command for the zone group to skip to a next track in the playback queue. Upon receiving the transmission and executing the command to skip to the next track, the first playback device 506 may send a message to the first controller device 502 indicating an updated playback state of the zone group. The message may identify the media content currently being played by the zone group (which was previously the next track prior to the command to skip), and the queue identifier for the playback queue of the zone group. Other examples are also possible.

In some examples, transmissions between the first controller device 502 and the first playback device 506 may also include a queue update identifier. Each queue update identifier may be associated with a modification to the playback queue or playback state of the playback queue. As such, the first controller device 502 that has control of the playback queue of the zone group may also maintain an updated queue update identifier associated with the playback queue.

For instance, upon populating of the playback queue with media items, the transmission from the first playback device 506 to the first controller device 502 may include a queue update identifier of "1." Subsequently, the transmission from the first controller device 502 to the first playback device 506 that includes the command to skip to the next track may also include the queue update identifier of "1." Then, upon executing the command, the transmission from the first playback device 506 to the first controller device 502 indicating the updated playback state may include a queue update identifier of "2."

The queue update identifier may be implemented to maintain a sequential order of transmissions and commands between the first playback device 506 and the first controller device 502. Implementation of the queue update identifier may, in some cases, eliminate race conditions. For instance, if the transmissions from the first controller device 502 that includes the command to skip to the next track included a queue update identifier other than "1," the first playback device 506 may ignore the transmission, or respond with an error message, because the first controller device 502, in this case, may not have an updated status of the first playback device 506 when sending the transmission. In other words, changes to the playback queue may have occurred prior to the transmission from the first controller device 502 due to commands from another controller device, and the first controller device 502 may not have been aware of the changes prior to sending the transmission.

b. Determining and Handling Loss of Zone Group Control

Upon gaining control of the playback queue of the zone group, the first controller device 502 may subsequently lose control of the playback queue of the zone group due to a number of reasons. In one example, the zone group may no longer exist. In one case, the zone group may no longer exist when a playback device has been added to or removed from the zone group. In another case, a group coordinator of the zone group may have been removed from the zone group. In another case, the zone group may have been split up into different zone groups. In a further case, the zone group may have been wholly or partially added to another zone group.

In another example, the first controller device 502 may no longer be in communication with the media playback system. For instance, the first controller device 502 may leave a communicative range of the media playback system.

In a further example, the playback queue of the zone group may have been assigned a different queue identifier. For instance, the second controller device 504 may have accessed the zone group and populated the playback queue of the zone group with media content from a software application running on the second controller device 504. As such, the different queue identifier may be assigned to the playback queue of the zone group.

In some cases, another controller interface, such as the first type of controller interface described above, or a second interface of the second type that is also running on the first controller device 502 may gain control of the playback queue of the zone group. As such, the first controller device 502 may effectively lose control of the playback queue of the zone group via the first software application, while gaining control of the playback queue of the zone group via the different controller interface. In other words, in discussions herein, control of a playback queue of a zone group may involve control of the playback queue of the zone group by a particular controller application on a controller device, and not necessarily control by the controller device. For instance, a first controller application on a controller device may lose control of the playback queue of the zone group when a second controller application the same controller device gains control of the playback queue of the zone group.

i. Zone Group No Longer Exists

Figure 6A:
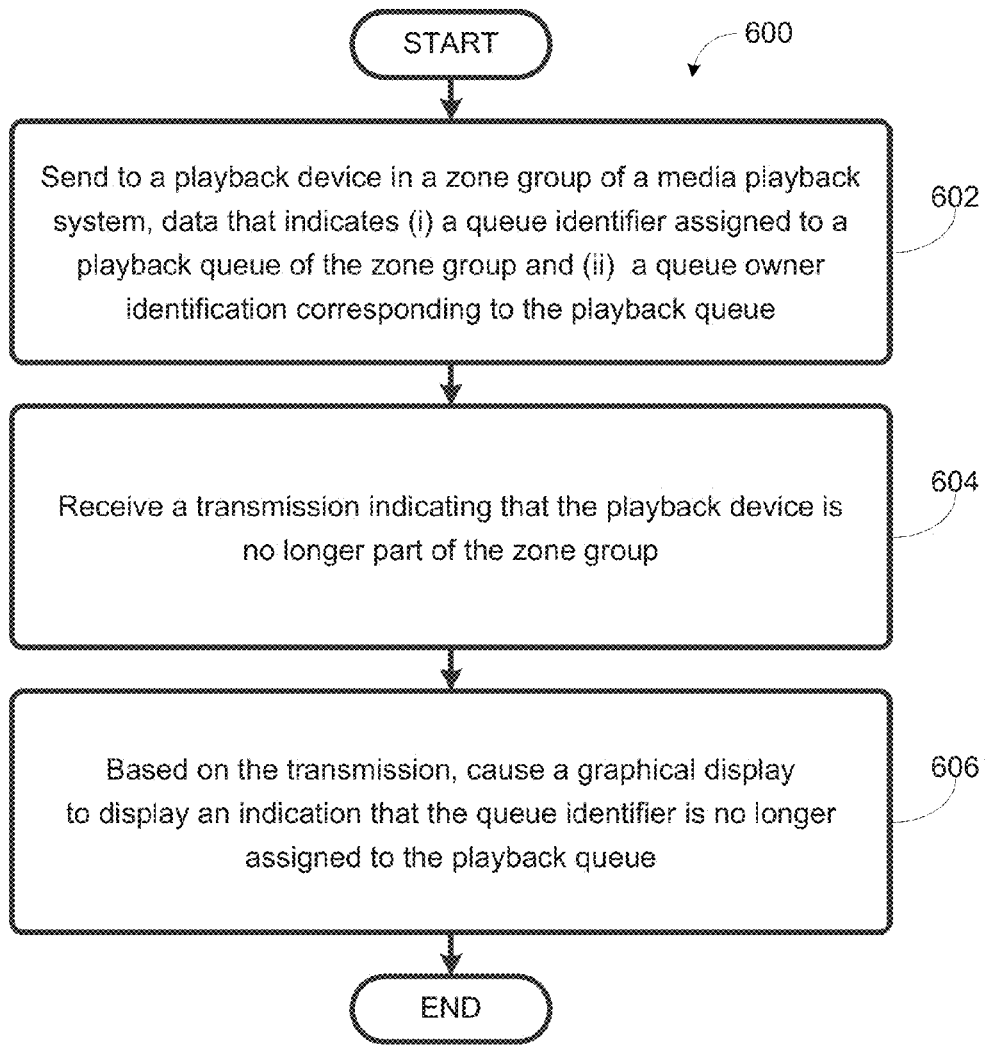
FIG. 6A shows an example flow diagram of a first method for determining, and handling a loss of zone group control.

FIG. 6A shows an example flow diagram of a first example method 600 for determining, and handling a loss of zone group control when the zone group no longer exists. Method 600 shown in FIG. 6A presents an embodiment of an example method that can be implemented within an operating environment involving, for example, the media playback system 100 of FIG. 1, one or more of the playback device 200 of FIG. 2, one or more of the control device 300 of FIG. 3, and the example media playback system environment 500 of FIG. 5. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block may represent circuitry that is wired to perform the specific logical functions in the process.

At block 602, the method 600 involves sending to a playback device in a zone group of a media playback system, data that indicates (i) a queue identifier assigned to a playback queue of the zone group and (ii) a queue owner identification corresponding to the playback queue. As indicated above, the queue owner identification may authorize the controller device to control the playback queue of the zone group while the queue identifier is assigned to the playback queue. In one case, as indicated above, control of the playback queue may, to a certain extent, involve control of the zone group. Continuing with the examples above, the data may be received by the first playback device 506 as the group coordinator of the zone group, from the first controller device 502 that has control of the playback queue of the zone group.

In one example, the data may be part of a transmission from the first controller device 502 to gain control of the playback queue of the zone group, as discussed above in section III.a. In another example, the data may be part of a transmission from the first controller device 502 to the first playback device 506 during communication after the first controller device 502 has gained control of the playback queue of the zone group, as also discussed above in connection in section III.a. For instance, the data may be part of a transmission that also includes a command to cause the zone group to perform a particular playback function. Other examples are also possible.

At block 604, the method 600 involves receiving a transmission indicating that the playback device is no longer part of the zone group. Continuing with the examples above, the transmission may be received from the first playback device 506, and may indicate that the first playback device 506 is no longer part of the zone group. In one case, the first playback device 506 may no longer be part of the zone group because the first playback device 506 was added to a different zone group. Because the first playback device 506 is the group coordinator, the zone group may no longer exist when the first playback device 506 is no longer part of the zone group.

In some cases, the first playback device 506, when leaving the zone group, may select another playback device, if any exist in the zone group, to become the new group coordinator of the zone group. For instance, if the second playback device 508 was also in the zone group, the first playback device 506 may cause the second playback device 508 to become the group coordinator of the zone group when the first playback device 506 leaves the zone group. In this case, the first playback device 506 and/or the second playback device 508 may send to the first controller device 502, a message indicating that the second playback device is now the group coordinator. In such a case, the zone group may continue to exist so long as a playback device that is capable of being a group coordinator is in the zone group, and the controller device 502 may continue to have control of the playback queue of the zone group.

Nevertheless, in some cases, the transmission indicating that the playback device is no longer part of the zone group may indicate that the zone group no longer exists, and that the first playback device 502 has lost control of the playback queue of the zone group.

In another example, the transmission may indicate a network topology that identifies all devices and zone configurations of the devices in the media playback system. The device from which the transmission indicating the network topology is received may be the first playback device 506 that is the group coordinator of the zone group, the second playback device 508, or any other device in the media playback system. In some cases, the first controller device 502 may receive the transmission indicating the network topology from another controller device, such as the second controller device 504.

In one example, if the zone group is not identified in the network topology, the first controller device 502 may determine based on the transmission indicating the network topology that the zone group no longer exists. In another example, if the network topology indicates that the first playback device 506 that is the group coordinator of the zone group is now in a different zone group, the controller device 502 may determine based on the transmission indicating the network topology that the zone group no longer exists. Other examples are also possible. In either case, the first controller device 502 may determine that the first controller device 502 has lost control of the playback queue of the zone group because the zone group no longer exists.

At block 606, the method 600 involves, based on the received transmission, causing a graphical display to display an indication that the playback queue is no longer associated with the zone group. As discussed above in connection to block 604, the first controller device 502 may determine, based on the transmission, that the first controller device 502 has lost control of the playback queue of the zone group.

In one example, a user interface of the software application running on the first controller device 502, such as that shown in FIG. 7A may be updated to indicate that the first controller device 502 has lost control of the playback queue of the zone group. FIG. 7B shows a second example of the interface 700 for controlling media playback. As shown, the graphical icon 706 of FIG. 7A may be updated to a graphical icon 706' to indicate that the first controller device 502 has lost control of the playback queue of the zone group. In one example, as shown, the graphical icon 706' may be a dimmed, or grayed out version of the graphical icon 706.

In another example, various icons and/or representations may be provided on the graphical display to indicate the first controller device 502 has lost control of the playback queue of the zone group. For instance, a text box may appear to inform the loss of control. Other examples are also possible.

In addition to displaying on the graphical display an indication that the first controller device 502 has lost control of the playback queue of the zone group, the first controller device 502 may also unsubscribe from messages relating to the zone group. In one example, the first controller device 502 may unsubscribe from messages indicating playback states of the zone group.

In one case, unsubscribing from the messages may involve the first controller device 502 sending to one or more devices in the media playback system, a request to not be transmitted the messages. In another case, unsubscribing from the messages may involve ignoring messages (or a subset of messages) broadcasted from some or all devices in the media playback system.

In another example, upon determining that the first controller device 502 has lost control of the playback queue of the zone group, the first controller device 502 may also responsively cease to send commands to the zone group. In one example, messages indicating playback states of the zone group may be sent by the first playback device 506 in response to a request for playback state information from the first controller device 502. In this case, the first controller device 502 may stop sending the request for playback state information. Other examples are also possible.

ii. Queue Identifier No Longer Assigned to Playback Queue of the Zone Group

In one example, as discussed above, transmissions between the first controller device 502 and the first playback device 506 while the first controller device 502 has control of the playback queue of the zone group may include both the queue identifier assigned to the playback queue of the zone group, and the queue owner identification, in addition to any inputs or commands for the zone group to execute. For instance, the first controller device 502 may send a transmission that includes the queue identifier, the queue owner identification, and a command for the zone group to skip to a next track in the playback queue. Upon receiving the transmission and executing the command to skip to the next track, the first playback device 506 may send a message to the first controller device 502 indicating an updated playback state of the zone group. The message may identify the media content currently being played by the zone group (which was previously the next track prior to the command to skip), and the queue identifier assigned to the playback queue of the zone group. Other examples are also possible.

Figure 6B:
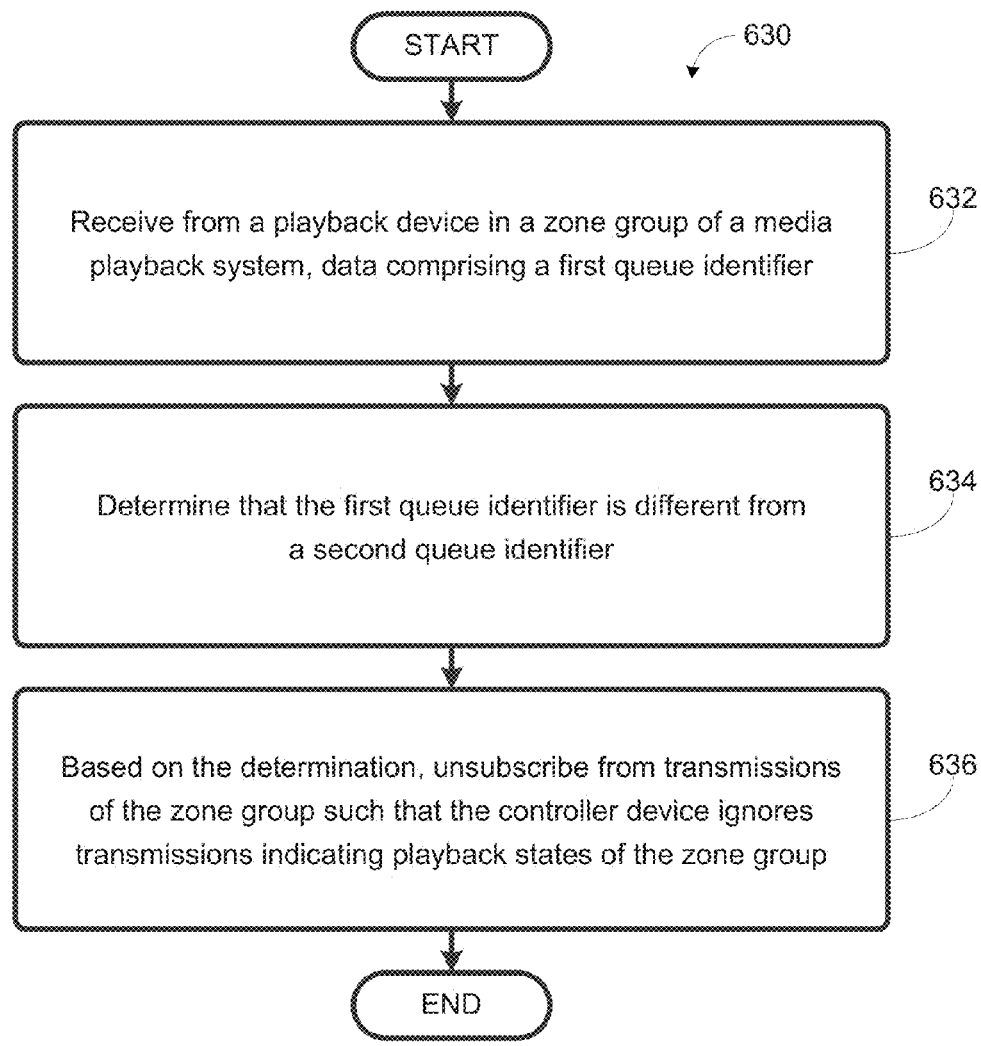
FIG. 6B shows an example flow diagram of a second method for determining, and handling a loss of zone group control.

FIG. 6B shows an example flow diagram of a second method 630 for determining, and handling a loss of zone group control, when the queue identifier is no longer assigned to the playback queue of the zone group. Method 630 shown in FIG. 6B presents an embodiment of another example method that can be implemented within an operating environment involving, for example, the media playback system 100 of FIG. 1, one or more of the playback device 200 of FIG. 2, one or more of the control device 300 of FIG. 3, and the example media playback system environment 500 of FIG. 5. Method 630 may include one or more operations, functions, or actions as illustrated by one or more of blocks 632-636. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 632, the method 630 involves receiving from a playback device in a zone group of a media playback system, data indicating a playback state of the zone group. The data comprises a first queue identifier that identifies a playback queue of the zone group. As discussed above in section III.a., communication between the first controller device 502 and the first playback device 506 while the first controller device 502 has control of the playback queue of the zone group may involve transmissions that indicate queue owner identifications and queue identifiers.

In one example, the first controller device 502, while in control of the playback queue, may subscribe to transmissions from the first playback device 506. Subscribing to the first playback device 506 may involve listening for transmissions from the first playback device 506. For instance, the first playback device 506 may broadcast or multi-cast transmissions indicating a playback state of the zone group for which the first playback device 506 is a group coordinator. The first controller device 502, when subscribed to the first playback device, may then receive and process the transmission.

In the case of block 632, the first controller device 502 may receive from the first playback device 506, the transmission indicating the playback state of the zone group because a playback state of the zone group has changed, because the first controller device 502 requested data indicating the playback state of the zone group, or as part of a periodic transmission of the playback state of the zone group. Other examples are also possible.

At block 634, the method 630 involves determining that the first queue identifier is different from a second queue identifier. As discussed above in section III.a., establishing control of the playback queue of the zone group by the first controller device 502 may involve generating a queue identifier that is assigned to the playback queue of the zone group, and a queue owner identification corresponding to the playback queue.

In one case, the second queue identifier may be a queue identifier previously assigned to the playback queue of the zone group. For instance, the second queue identifier may have been assigned to the playback queue when the first controller device 502 gained control of the playback queue of the zone group. Subsequently, the first queue identifier may have been assigned to the playback queue of the zone group when the playback queue is modified, or when another device has gained control of the playback queue. Accordingly, the first controller device 502, upon receiving the first queue identifier that is different from the second queue identifier, may determine that the playback queue of the zone group is no longer the playback queue previously populated with media content identified in a playlist on the first controller device 502.

In one example, the data identifying the first queue identifier and the data identifying the second queue identifier may have both been received from the first playback device 506 that was the group coordinator of the zone group when respective data indicating the queue identifiers were received. In another example, the data identifying the second queue identifier may have been received from another device in the media playback system other than the first playback device 506, such as the second playback device 508. For instance, the second playback device 508 may have been the group coordinator of the zone group when the first controller device 502 previously gained control of the playback queue of the zone group. Between when the control of the playback queue of the zone group by the first controller device 502 was established and when the data indicating the first queue identifier was received, the group coordinator of the zone group may have changed from the second playback device 508 to the first playback device 506. Other examples are also possible.

Whichever the case, the first controller device 502 may determine, based on the determination that the first queue identifier is different from the second queue identifier, that the second queue identifier is no longer assigned to the playback queue of the zone group, and that the first controller device 502 has lost control of the playback queue of the zone group.

At block 636, the method 630 involves, based on the determination that the first queue identifier is different from the second queue identifier, unsubscribing from transmissions of the zone group such that the controller device ignores transmissions indicating playback states of the zone group. As discussed above, unsubscribing from transmissions of the zone group may involve the first controller device 502 sending to one or more devices in the media playback system, a request to not be transmitted any messages. In another case, unsubscribing from the messages may involve ignoring messages (or a subset of messages) broadcasted from some or all devices in the media playback system. For instance, the first controller device 502 may no longer listen for the broadcasted or multi-casted transmissions from the first playback device 506.

Also as discussed above, upon determining that the first controller device 502 has lost control of the playback queue of the zone group, the first controller device 502 may also responsively cease to send commands to the zone group. In one example, messages indicating playback states of the zone group may be sent by the first playback device 506 in response to a request for playback state information from the first controller device 502. In this case, the first controller device 502 may stop sending the request for playback state information. Other examples are also possible.

Further, upon determining that the first controller device 502 has lost control of the playback queue of the zone group, the first controller device 502 may cause the graphical display to display an indication that the playback queue is not associated with the zone group, such as that shown in FIG. 7B and discussed above.

iii. Controller Device No Longer in Communication with Media Playback System

Figure 6C:
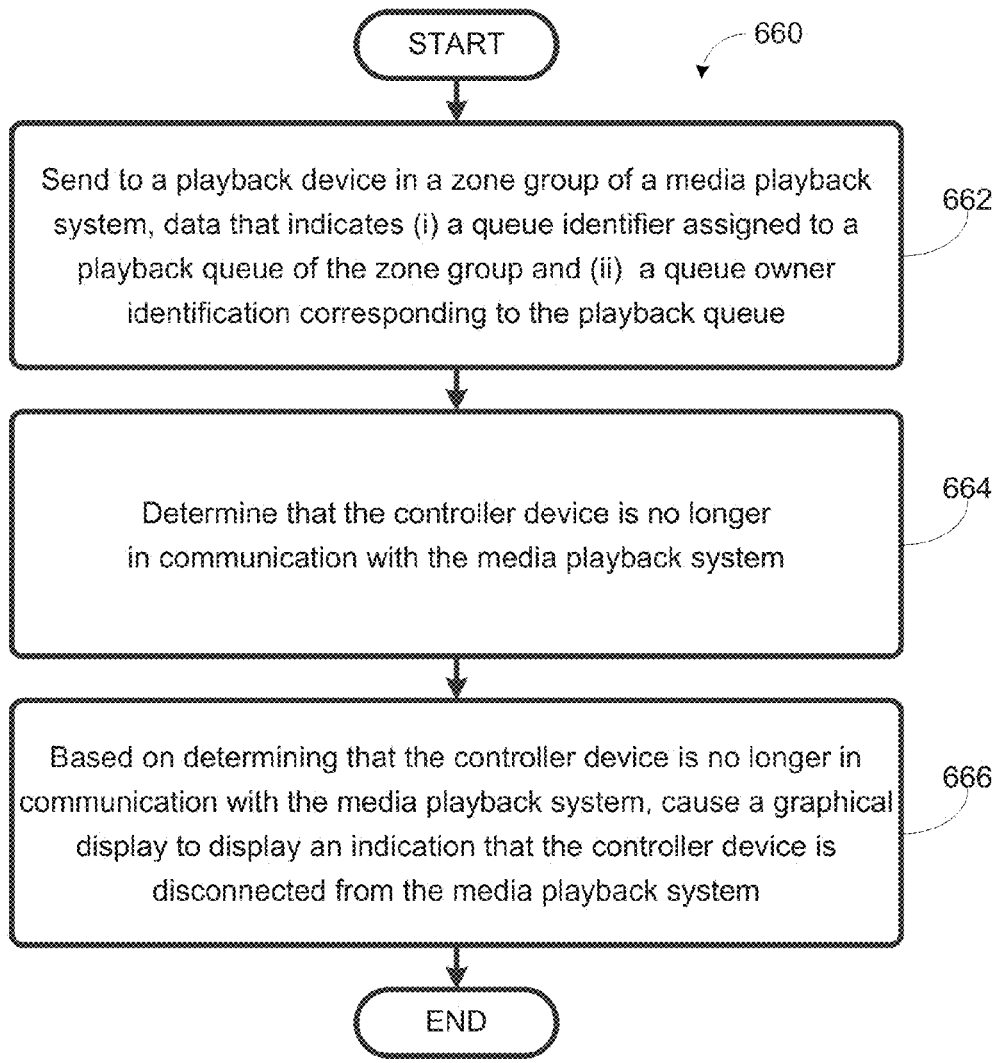
FIG. 6C shows an example flow diagram of a third method for determining, and handling a loss of zone group control.

FIG. 6C shows an example flow diagram of a third method 660 for determining, and handling a loss of zone group control when the controller device is no longer in communication with the media playback system. Method 660 shown in FIG. 6C presents an embodiment of a further example method that can be implemented within an operating environment involving, for example, the media playback system 100 of FIG. 1, one or more of the playback device 200 of FIG. 2, one or more of the control device 300 of FIG. 3, and the example media playback system environment 500 of FIG. 5. Method 660 may include one or more operations, functions, or actions as illustrated by one or more of blocks 662-666. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 662, the method 660 involves sending to a playback device in a zone group of a media playback system, data that indicates (i) a queue identifier assigned to a playback queue of the zone group and (ii) a queue owner identification corresponding to the playback queue. In one example, block 662 may be similar to block 602 of the method 600 shown in FIG. 6A. As such, discussions above in connection to block 602 may also be applicable to block 662.

At block 664, the method 660 involves determining that the controller device is no longer in communication with the media playback system. In one example, determining that the controller device is no longer in communication with the media playback may involve receiving an input to deactivate a wireless communication interface of the controller device. In other words, the first controller device 502 may no longer be in communication with the media playback system when the wireless communication capability of the first controller device 502 is disabled, for example, by a user.

In another example, determining that the controller device is no longer in communication with the media playback system may involve determining that no transmission has been received from the media playback system for a predetermined duration of time. In one case, the first controller device 502 may request data from the first playback device 506 (or another device in the zone group or media playback system), but may not receive a transmission in response to the request. After not receiving a response transmission within the predetermined duration of time, the first controller device 502 may determine that the first controller device 502 is no longer in communication with the media playback system.

The loss of communication between the first controller device 502 and the media playback system may be due to a number of reasons. In one case, a local area network via which the first controller device 502 and the media playback system communicate may be unavailable. In another case, the first controller device 502 may be a mobile device that has been moved beyond communicative range of the media playback system. In either case, after the predetermined duration of time, the first controller device 502 may determine that the first controller device 502 is no longer in communication with the media playback system, and has therefore lost control of the playback queue of the zone group. Other examples are also possible.

In another example, the loss of communication between the first controller device 502 and the media playback system may be determined after the first controller device 502 had lost communication with the media playback system, and subsequently regained communication with the media playback system. In one case, a queue update identifier received from the first playback device 506 after regaining communication with the media playback system may not incrementally match a queue update identifier previously received by the first controller device 502, prior to the loss of communication. The loss of communication in this case may be based on the mismatched queue update identifier.

In a further example, communication between the first controller device 502 and the media playback system may be disconnected when the first controller device 502 is outside of a predetermined physical border of the media playback system, even if the first controller device 502 may otherwise be within communicative range of the media playback system. For instance, the first controller device 502 may have physically moved to a neighboring household while still in communicative range of the media playback system. Nevertheless, the first controller device 502 may be outside of the predetermined physical border of the media playback system, and communication between the first controller device 502 and the media playback system may accordingly be disconnected, resulting in a loss of communication.

At block 666, the method 660 involves responsively, causing a graphical display to display an indication that the device is disconnected from the media playback system. In one example, block 666 may be similar to block 606 of the method 600 shown in FIG. 6A. As such, discussions above in connection to block 606 may also be applicable to block 666. Further, as discussed above, the first controller device 502 may further unsubscribe from the zone group and or cease to send commands to the zone group.

In one example, the first controller device 502, after becoming no longer in communication with the media playback system and losing control of the playback queue zone group, may reestablish communication with the media playback system and regain control of the playback queue of the zone group. For instance, the first controller device 502, upon reestablishing communication with the media playback system, may send to the first playback device 506, data indicating the queue owner identification. In response, the first playback device 506 may send to the first controller device 502 data indicating a queue identifier assigned to the playback queue of the zone group (for which the first playback device 506 is a group coordinator). In this case, if the queue identifier matches a queue identifier assigned to the playback queue of the zone group before the first controller device 502 lost communication with the media playback system, the first controller device 502 may regain control of the playback queue of the zone group. In response to regaining control of the playback queue of the zone group, the first controller device 502 may cause the graphical display to display an indication that the first controller device 502 is once again authorized to control the zone group. The indication may be similar to the graphical icon 706 shown in FIG. 7A.

In another example, upon reestablishing communication with the media playback system, the first controller device 502 may gain control of the playback zone as discussed in section III.a. In other words, the first controller device 502 may effectively gain control of the playback queue of the zone group such that a new queue identifier is assigned to the playback queue of the zone group. In this case, a different queue owner identification may also be generated to allow the first controller device 502 to control the zone group while the new queue identifier is assigned to the playback queue. Other examples are also possible.

One having ordinary skill in the art will appreciate that the examples provided above are illustrative and should not be considered limiting. For instance, while communications between the first controller device 502 and the zone group as described above involve communications between the first controller device 502 and the first playback device 506, as the single group coordinator of the zone group, communications between the first controller device 502 and the zone group may involve communications between the first controller device 502 and other devices in, or associated with the zone group. In some cases, the zone group may be more than one group coordinator, in which case communications between the first controller device 502 and the zone group may involve communications between the first controller device 502 and both the first playback device 506 and the other group coordinator device in the zone group. Other examples are also possible.

While the discussions herein generally refer to playback devices in a media playback system and controller devices used to access and control the media playback system, one having ordinary skill in the art will appreciate that concepts illustrated by the examples herein may also be applied to other networked systems. For instance, a controller device may gain control of, and subsequently lose control of one or more home appliances in one or more rooms in a house, or one or more machines in one or more operating zones of a warehouse or factory. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:
1. A method comprising:
sending, via a controller device to a playback device in a zone group of a media playback system, data that indicates (i) a queue identifier assigned to a playback queue of the zone group, and (ii) a queue owner identification corresponding to the playback queue, wherein the queue owner identification authorizes the controller device to control the playback queue while the queue identifier is assigned to the playback queue;

receiving, via the controller device, a transmission indicating that the playback device is no longer part of the zone group; and
based on the received transmission, causing, via the controller device, a graphical display to display an indication that the queue identifier is no longer assigned to the playback queue.

2. The method of claim 1, wherein the playback device is a playback device that coordinates synchronous playback of media content by one or more playback devices in the zone group.

3. The method of claim 1, wherein the transmission comprises data indicating a network topology of playback devices in the media playback system, and wherein the method further comprises:
based on the network topology, determining, by the controller device, that the playback device is no longer a part of the zone group.

4. The method of claim 3, wherein based on the network topology, determining, via the controller device, that the playback device is no longer a part of the zone group further comprises:
determining, by the controller device, that the zone group no longer exists.

5. The method of claim 1, wherein the playback device is a first playback device, and wherein the transmission is received from a second playback device in the media playback system.

6. The method of claim 1, wherein the transmission is received from the playback device in the zone group.

7. The method of claim 6, wherein the transmission comprises a message indicating that the playback device has left the zone group.

8. The method of claim 1, further comprising:
based on the transmission, unsubscribing, via the controller device, from transmissions of the zone group such that the controller device ignores transmissions indicating playback states of the zone group.

9. A device comprising:
a processor; and
memory having stored thereon instructions executable by the processor to cause the device to perform functions comprising:
receiving from a playback device in a zone group of a media playback system, data indicating a playback state of the zone group, wherein the data indicates a first queue identifier assigned to a playback queue of the zone group;
determining that the first queue identifier is different from a second queue identifier, wherein the second queue identifier was previously assigned to the playback queue; and
based on the determination that the first queue identifier is different from the second queue identifier, unsubscribing from transmissions of the zone group such that the device ignores transmissions indicating playback states of the zone group.

10. The device of claim 9, wherein the playback device is a first playback device, and wherein the functions further comprise:
prior to receiving the data indicating the playback state of the zone group, sending to a second playback device, data indicating the second queue identifier.

11. The device of claim 10, wherein the first playback device and the second playback device are the same device.

12. The device of claim 9, wherein the functions further comprise:

based on the determination that the first queue identifier is different from the second queue identifier, causing a graphical display to display an indication that the second queue identifier is no longer assigned to the playback queue.

13. The device of claim 9, wherein the playback device is a playback device that coordinates synchronous playback of media content by one or more playback devices in the zone group.

14. A non-transitory computer-readable medium having stored thereon instructions executable by a computing device to cause the computing device to perform functions comprising:
sending to a playback device in a zone group of a media playback system, data that indicates (i) a queue identifier assigned to a playback queue of the zone group, and (ii) a queue owner identification corresponding to the playback queue, wherein the queue owner identification authorizes the computing device to control the playback queue while the queue identifier is assigned to the playback queue;
determining that the computing device is no longer in communication with the media playback system; and
based on determining that the computing device is no longer in communication with the media playback system, causing a graphical display to display an indication that the computing device is disconnected from the media playback system.

15. The non-transitory computer-readable medium of claim 14, wherein the functions further comprise:
upon re-establishing communication between the computing device and the media playback system, determining that the queue identifier is still assigned to the playback queue; and
responsively, causing the graphical display to display an indication that the computing device is authorized to control the zone group.

16. The non-transitory computer-readable medium of claim 15, wherein the function of determining that the playback queue is associated with the zone group further comprises:
receiving from the playback device, a queue identifier that identifies the playback queue.

17. The non-transitory computer-readable medium of claim 15, wherein the function of determining that the playback queue is associated with the zone group further comprises:
sending a transmission indicating the queue owner identification corresponding to the playback queue.

18. The non-transitory computer-readable medium of claim 14, wherein the playback device is a playback device that coordinates synchronous playback of media content by one or more playback devices in the zone group.

19. The non-transitory computer-readable medium of claim 14, wherein the function of determining that the computing device is no longer in communication with the media playback system comprises:
determining that no transmission has been received from the media playback system for a predetermined duration of time.

20. The non-transitory computer-readable medium of claim 14, wherein the function of determining that the computing device is no longer in communication with the media playback system comprises:

receiving an input to deactivate a wireless communication interface of the computing device.

* * * * *